Sept. 14, 1965         A. M. STONER                3,205,677
         PORTABLE DEVICE FOR COOLING DRINKING GLASSES AND
                     THE LIKE AND THEIR CONTENTS
Filed Dec. 17, 1962                              2 Sheets-Sheet 1
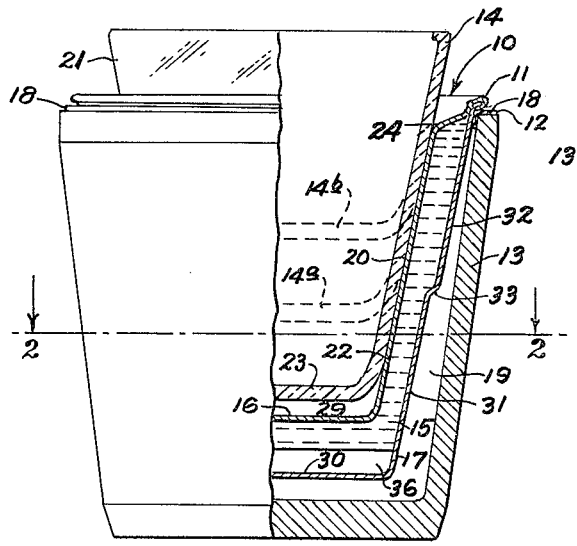
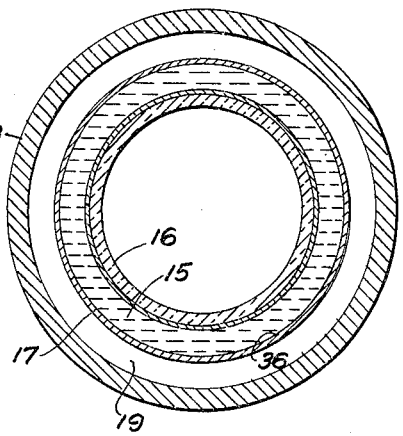
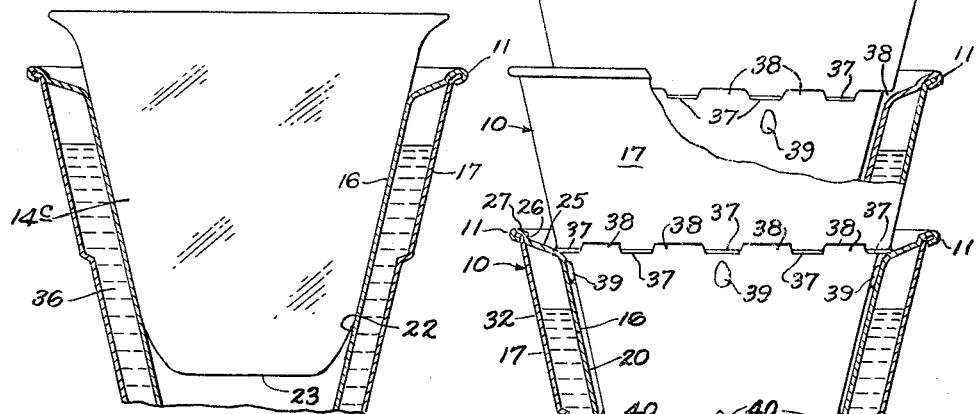
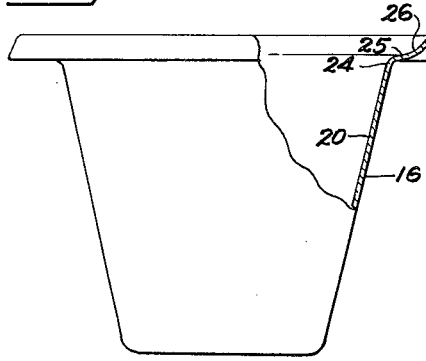
INVENTOR.
ARTHUR M. STONER
BY
ATTORNEY ved Sept. 14, 1965

3,205,677
PORTABLE DEVICE FOR COOLING DRINK-
ING GLASSES AND THE LIKE AND THEIR
CONTENTS
Arthur M. Stoner, P.O. Box 134, Madison, Conn.
Filed Dec. 17, 1962, Ser. No. 245,073
10 Claims. (Cl. 62—457)

This invention relates to a portable device for cooling drinking glasses and the like and their contents.

It has long been recognized that putting ice into the various drinks and foods requiring cooling or maintenance at a cool temperature, is often undesirable because the melting of the ice dilutes the drink or food. One attempt to solve the problem of keeping cool an individual drink or portion of food is exemplified by the familiar large bowls that are filled with ice and that have a support ring for a glass containing a seafood cocktail, fruit cocktail, or fruit juice. Such apparatus is bulky, tends to be messy, and takes time to fill with ice, empty out, and so on. It is rarely used with mixed drinks.

The expedient of cooling the glasses directly by electrical refrigeration does not solve the problem of keeping them, or their contents, cool once the glasses are taken out of the refrigerator.

Attempts to solve this problem by using double-walled glasses with refrigerant between the walls have not heretofore proved satisfactory. People have not liked to hold and drink from such glasses, and the glasses were quite expensive. Also, they absorb heat from the outside as well as through the drink.

One object of this invention is to make it possible for inexpensive glassware made to standard production tolerances to be used in conjunction with a separate device for cooling or keeping cool the actual glass in which the food or drink is served. While using a conventional type of glass, the invention requires only that they have a predetermined taper, or in other words, a matching of the glass to the cooling device. The invention employs a novel type of double-walled cooling container with refrigerant between its walls, the glass being inserted in and being freely removable from the cooling container.

An important problem, however, arises when using inexpensive glassware made to standard production tolerances to provide a device which will obtain efficient cooling from a double-walled cooling container, in spite of the surface irregularities which inexpensive glasses made by standard production methods have. Obviously it would be unfeasible to require that the surface of the glasses have no surface irregularities, for precision manufacture of glasses would add too much to their cost.

Another problem which occurs when using glasses in cooling devices is how to prevent them from freezing to the device so that they cannot be taken out conveniently. An object of this invention is to prevent such sticking together of the glass and the cooling device.

Another problem is how to keep the cooling containers themselves from taking up too much space in the freezer when the refrigerant is being frozen. When typical double-walled containers are nested together in stacks, if there is any moisture between them, it freezes and they tend to stick together so that it becomes practically impossible to take them apart without damaging them. An object of this invention is to prevent such containers from sticking together even when they are stacked and put in the freezer and their refrigerant frozen.

Another object of the invention is to provide a combination in which the double-walled container, when taken out of the freezer for use, is supported by a housing member that need not itself be cooled but which affords a dead-air space around the metal walls of the double-walled container. A feature of the combination is that the double-wall container is freely separable from the housing at will.

Another important problem to which this invention is directed is retaining the frozen refrigerant in the proper position as it begins to thaw. In a double-walled container the refrigerant cannot take up 100% of the space between the walls, or else its expansion breaks the container. Moreover, when frozen, the refrigerant should not lie at the bottom because the bottom of the glass and of its contents is the least important part to cool or to keep cool. The refrigerant should be maintained along the sides, up as close to the top as the glass is filled. For this reason, it is better to put the container upside down into the freezer, so that the voids are at the bottom when the cooling container is taken from the freezer and placed upright for use. However, as the refrigerant thaws, it tends to enable the still solid portion to slide down toward the bottom along with the liquid that will necessarily gravitate thereto, thereby reducing the efficiency of the cooling device. Even the tapering of the walls does not prevent this downward movement of the solid body. Therefore, it is an object of the invention to delay for a longer time such downward gravitation of the still solid refrigerant.

Another object of the invention is to provide a double-walled cooling container that can be manufactured by standard seaming equipment.

Other objects and advantages of the invention will appear from the following description of some preferred forms thereof.

In the drawings:

FIG. 1 is a view in elevation and about half in section of a cooling device embodying the principles of the invention shown in use with a glass inside. Broken lines show how smaller glasses may be used in the same cooling container, at different times, instead of having to use a different container.

FIG. 2 is a view in horizontal section taken along the line 2—2 in FIG. 1.

FIG. 3 is a fragmentary view in elevation and partly in section of a modified form of glass in the cooling device, parts being broken away and the outer housing omitted.

FIG. 4 is a view in elevation and partly in section of the inner cup making up about half of the double-walled container, the inner cup being shown before being assembled with the outer cup.

FIG. 6 is a view in elevation and partly in section showing three of the double-walled containers stacked together.

Figure 5:
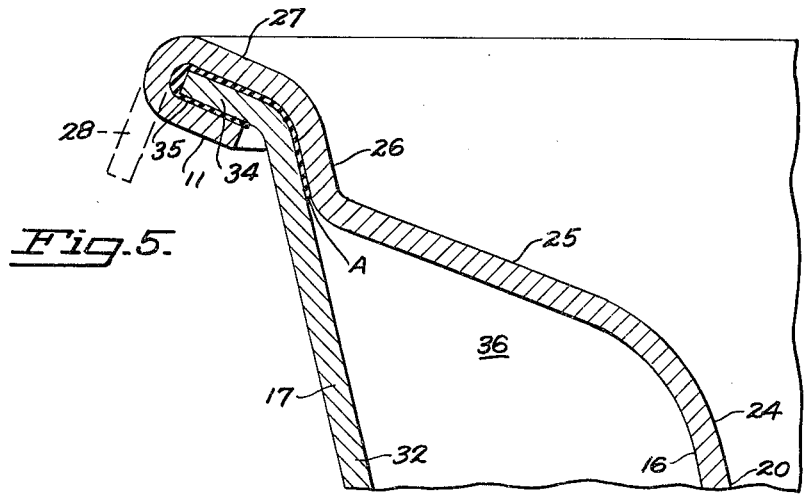
FIG. 5 is a large fragmentary view in elevation and in section showing how the inner and outer cups of the double-walled container are seamed together, the original shape of the flanged rim of the inner container being shown in broken lines, its final closed position when seamed being shown in solid lines.

The invention comprises a double-walled cooling container 10 having a lip 11 at the upper end that rests on the rim 12 of an outer housing 13, during use. A glass 14 to be cooled, or whose contents are to be kept cool, is simply placed inside the container 10, from which it is freely separable, as is the container 10 from the housing 13. The container 10 holds a suitable refrigerant, such as a liquid 15 in between an inner cup 16 and an outer cup 17, both of which are preferably metal.

The outer housing 13 may be made of wood, china, plastic, or metal; in the event that it is made of metal, it is desirable to provide an annular plastic gasket 18 which is cemented to or otherwise affixed to the rim of the outer housing 13 and thereby insulates the double-walled container 10 from the outer housing 13. The remainder of the insulation between the two units 10 and 13 is provided by a dead air space 19 formed by so constructing the housing 13 and the container 10 that their walls are necessarily spaced from each other. One purpose of this is to prevent wasting the cooling power of the refrigerant 15. Where the housing 13 is of wood, china, plastic, or other insulating material, there need be no gasket 18.

An important feature of the invention is that the inner container 10 is freely disengageable from the outer housing 13 for freezing its refrigerant 15 or for any other purpose, such as dishwashing, and the separation, may be accomplished merely by lifting the container 10 up by its lip 11.

The double-walled container 10 is a finished unit which, once assembled, is not taken apart. Its inner cup 16 is provided with a smoothly tapering side wall 20 which, during most of its extent, is preferably smoothly tapered at an included angle lying between 10° and 30° with respect to the axis. Any glass 14, 14a, 14b (FIG. 1) or 14c (FIG. 3), having substantially the same taper, may be installed into the inner cup 16 substantially in contact with the inner wall 20 over most of the height of the glass. Since the upper end 21 of the glass 14, 14a, 14b, or 14c will stick out above the lip 11, for best results the drink or food in the glass should not be filled above the height which will lie within the container 10, the portion 21 thereabove enabling the glass to be readily removed from the container 10 or to be engaged by the lips while in the container 10. Preferably, the weight of the glass 14, 14a,, 14b, or 14c is kept at a minimum in order to obtain maximum efficiency of the cooling of its contents. Glasses having a heavy wall or a thick bottom are less desirable, for glasses are usually stored at room temperature, and any excess weight of glass will absorb the cooling energy available from the refrigerant 15 and retard the initial rate of cooling of the glass and of its contents.

I have found that the angle of the taper of the wall 20, that is, the angle which the wall 20 makes with its axis or with a cylinder, should not be less than 5°; otherwise the glasses 14 have an excessive tendency to stick to the wall 20. During use, a layer of frost unavoidably forms on the inner surface of the wall 20; this frost, however, is of no harm, and, as will be seen in a moment, is of a positive advantage when the taper of the wall is greater that 5° (or an included angle of 10°), but if the taper is less than that, the frost tends to cause such a binding that the glass 14 will stick in the container 10 and cannot be withdrawn. A 15° taper (or included angle of 30°) appears to be about the maximum that should be used without overly reducing the thermal efficiency of the device by having a large top opening and without causing the glasses to occupy too much storage space.

The outside taper on the glass 14, 14a, 14b, 14c, etc. should, of course, be accurately maintained as practical inexpensive glass-manufacturing technique permits. The taper should usually begin at a point about ⅝″ below the lip of the glass and extend to a circle 22 within about half an inch of the bottom 23 of each glass. Contact between the glass and the wall 20 is not necessary near the bottom of the glass, because the practical problem is to get the maximum cooling efficiency for the contents of the glass when the glass is full. As the contents are consumed, the cooling requirements become less anyway. The exterior of each glass below the circle 22 tapers in from the tapered surface which is intended to fit the tapered wall 20, so that any irregularities in the contour of the glass near the bottom 23 cannot interfere with the fit of the main tapered area above the circle 22. It is an advantage of this invention that it is adaptable for use with inexpensive glasses made to standard production tolerances.

The close fit between the wall 20 and the glass 14 is important because of the nature of the heat transfer here. Some heat is transferred by direct contact of the glass wall with the cooler wall 20. Most of the heat transfer, however, occurs through a film of moisture between the surfaces of the glass and the wall 20. If such surfaces are separated by not more than about 0.012″, the frost which forms on the inner surface of the cooler wall 20, melts when the glass 14 is first put into the cooler 10. The moisture drops then spread to partially cover the area, the moisture being retained in position by capillary action and acting to make contact even where the glass has surface irregularities. Thus, the slight ripples often present in drinking tumblers cause no trouble because the moisture from the frost spreads to make contact even there.

The inner cup 16 has a diverging portion 24 at the upper end of its main tapered wall 20 which diverges from the taper (and hence from the glass 14) preferably at about 1½° to insure the best fit between the wall 20 and the glass in the area immediately below this portion 24. Above the portion 24, the cup 16 diverges in an outwardly extending flange 25 to a step-like portion 26 which is preferably provided to enable the device to be formed from deep-drawn aluminum, the resulting depression being used for centering and supporting the two cups 16 and 17 during the spinning operation for sealing them together. Outside of the step 26 is an upper flange 27. All the flange portions 25, 26, and 27 are tapered inwardly to drain condensation down into the inner cup 16, so that it will not drop water on a table or elsewhere and so that it will provide moisture for completing the conductive circuit between the surface 20 and the glass 16. From the flange portion 27 a seaming flange 28 extends downwardly and outwardly. The bottom wall 29 of the inner cup 16 is imperforate.

The outer cup 17 has a bottom wall 30 which, when the unit 10 is assembled, is spaced axially below the bottom wall 29 of the inner cup 16. The cup 17 also has a lower side wall 31 and an upper side wall 32 which meet at a supporting shoulder 33. These walls 31 and 32 preferably lie substantially parallel to the wall 20, and the purpose of the shoulder 33 is to hold the still-frozen portions of the refrigerant in position during thawing. The walls 31 and 32 may taper smoothly above and below the shoulder 33. At its upper end the outer cup 17 is provided with a flange 34 which is coated while upside down, if desired, with a suitable gasket material 35. After the refrigerant 15 has been placed in the space 36 between the two cups 16 and 17, the sealing operation can be done in a conventional can-closing machine by closing the flange 28 up against the gasketed underside of the flange 34. The joint is made tight and is sealed by the gasket 35. This seaming operation also thereby provides the final form of the lip 11 which will later rest on the rim 12 of the outer housing 13.

The outer cup 17 is also provided at its shoulder 33 with a series of separated projections 37; for example, there may be eight of them, which preferably extend out about 0.050″ to provide between them drain slots 38 for moisture that runs down the outside of the wall 31. Also, these projections 37 take the weight of stacking when the containers 10 are stacked together; their area is so small that they do not cause sticking even when the containers 10 are stacked together and the refrigerant frozen. In addition, four spaced spot projections 39 and four spaced projections 40 are preferably formed on the tapered wall 31. These may extend out about 0.030″, one set being high on the lower wall 31 and the other near the bottom. These projections 39 and 40 also help to keep the tapered surfaces 31 from sticking to a wall 20 of another container 10 during stacking, and the separation enables drops of moisture to flow between them instead of spreading and freezing and sticking the coolers 10 together when they are stacked and put into the freezer. By thus separating the adjacent surfaces of stacked containers 10 by 0.030" or more, the moisture drains when the units are stacked, and the surface engagement is so small that freezing there does not cause sticking.

The volume of the space 36 between the double walls 20 and 31, 32 for best results is preferably about three-quarters of the capacity of the largest glass 14 to be used. The refrigerant 15 preferably fills approximately 80% ±5% of the space 36, so that the space 36 is not so filled that expansion of the liquid 15 as it cools can cause damage to the container 10. Preferably, a coolant 15 is used which freezes at about 26° to 28° F. A much lower freezing-point material 15 tends to cause the glass 14 to freeze and stick in the cooler 10, while it also lowers the thermal capacity, since the agents added to water to reduce its freezing point also reduce the specific heat of the resulting solution.

Of course, the container 10 may be made with its inner wall 20 having a different form from a strictly frusto-conical surface. It can be curved, so long as the glasses are made to match it, but the tapered surface is usually less expensive and more practical.

In use, the containers 10 are stacked upside down and put into a freezer for sufficient time to bring their temperature down to about 0° F. When the containers are to be used, they are taken out of the freezer, and each container 10 is placed in its housing 13 with its lip 11 resting on the rim 12; the assembly may be left this way for a while, if desired. An empty glass 14 may then be placed in the double-walled container 10 and it may be left empty for perhaps 20 minutes prior to filling, or, if desired, the glass can be filled before being put into the cooler 10. If the glass 14 is put in empty and left for a while, the drink is cooled more quickly, timing from the moment the drink is poured. The assembly can be held by the consumer as a unit and he can drink from the glass while it is in the cooling unit, or he can, if he prefers, take the glass out to drink from.

Figure 7:
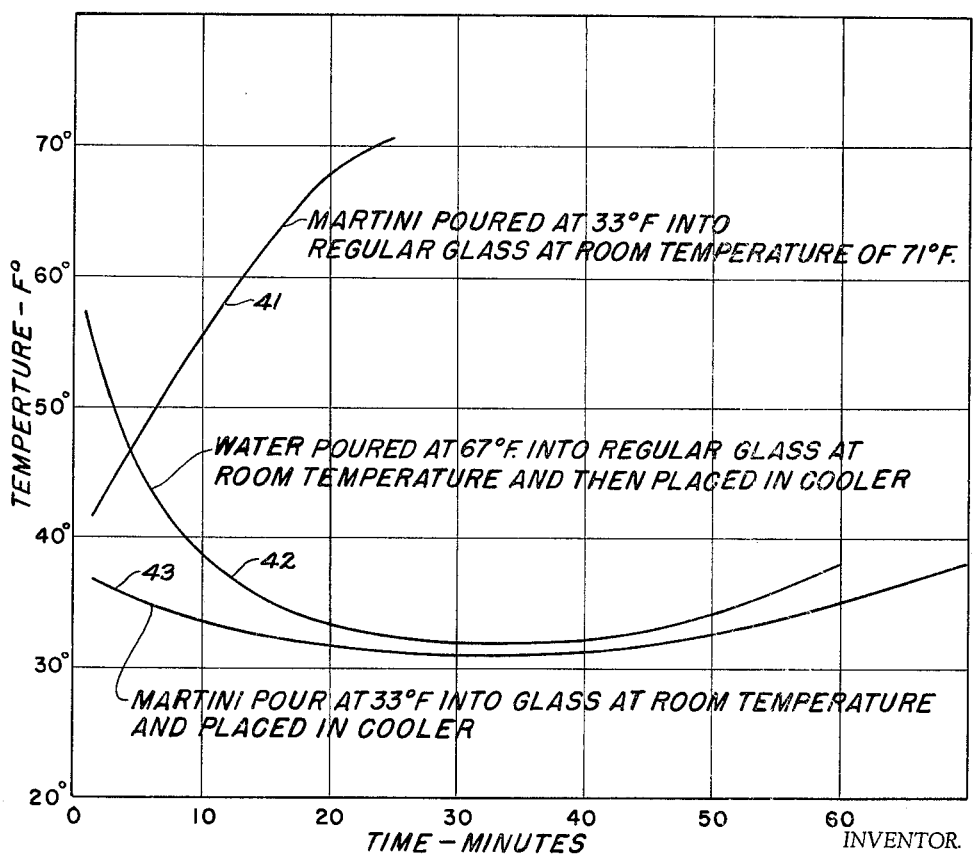
FIG. 7 is a graph comparing the cooling effects of the invention with an uncooled glass.

As shown in FIG. 7, the invention produces a rather flat time-temperature curve. The curve 41 indicates the temperature rise with time of a drink that was made in a cocktail mixer and poured out at 33° F. into a regular glass at room temperature, and left out in the room. As soon as its temperature could be measured, it was already warmer, because the glass was warm. The temperature so rose that within 25 minutes it reached more than 70°. The two lower curves 42 and 43 show use of the cooler of this invention. For the upper curve 42 water was poured into a glass at 67° F. and the glass placed in the cooler 10; it will be seen that the temperature dropped rapidly to nearly freezing and that after an hour the temperature was still below 40° F. The curve 43 represents a drink made at 33° F. in the same mixer as that used for the curve 41, and again the drink was poured into a room-temperature glass, but the glass was then placed in the cooler 10. It will be seen that the temperature of this sample started out lower, because the glass was put into the cooler immediately, and that after an hour the temperature was still about 35° F., only about two degrees over the temperature of the drink when it was poured from the mixer. During that time the temperature of the drink had actually dropped below 32° F., but of course it did not freeze due to the fact that there was alcohol in this mixture.

What appears to happen is that when the double-walled container 10 is first removed from the freezer, frost forms on the wall 20, and when the glass 14 is put in, if the contents of the glass are cold, the glass contact is with the frost; the contact area between the frosted surface and the glass is not very great due to the irregular surface of low-priced tumblers. At this point the temperature difference between the cooler and the glass is great, and if the contact area were greater, the liquid in the glass would tend to freeze on the inner surface of the glass, an undesirable effect. When the refrigerant 15 starts to melt, the temperature of the tapered bore 20 becomes that of the melting point of the refrigerant, about 25° to 28° F. At this point the frost on the wall 20 melts from contact with the glass, the moisture spreads, and it is retained by capillary action, thereby increasing the area of the conductive circuit between the refrigerant and the contents of the glass. As the refrigerant melts further, the amount of moisture condensed on the tapered surfaces of both the glass 14 and the wall 20 increases, producing a further stabilizing effect. Hence, the temperature of the drink rises very slowly.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A portable cooling device, including in combination:
   a double-walled container having an inner wall smoothly flared and
   an outer wall spaced out from said inner wall radially and axially at the lower end, said walls being permanently sealed together at their upper ends providing a lip and having a supporting shoulder therebelow.
   a refrigerant in the liquid in between said walls filling most but not all the space between them, said refrigerant liquid frozen while said double-walled container is inverted, before use of said device, radial spot projections adjacent opposite ends of said outer wall,
   an outer container having an upper end on which said shoulder of said double-walled container rests when said device is in use, said container being spaced from said double-walled container at all other points by said spot projections to provide a dead air space therebetween, said container being freely separable from said double-walled container by said spot projections merely lifting said double-walled container by its said lip, so that only said double-walled container need be pre-cooled in a freezer, and
   a separate vessel tapered to match the flare of said inner wall of said double-walled container and having an upper end extending above the upper end of said double-walled container, said vessel being freely insertable in and removable from said double-walled container for the cooling of its contents by said double-walled container and the consumption of its contents away from said container.

2. The device of claim 1 in which said outer walls have a plurality of circumferentially arranged and vertically space spot projections with small surface areas, enabling water to drip down between them and enabling a plurality of said containers to nest without resultant sticking together when they are cold.

3. A portable device for cooling drinking glasses and the like and their contents, including in combination:
   a double-walled container having an inner wall smoothly flared to receive glasses generally matching its flare and to afford contact therewith over a substantial height, and
   an outer wall spaced out from said inner wall radially and axially at the lower end, said walls being sealed together at a lip at their upper ends,
   a refrigerant liquid in between said walls filling most but not all the space between them, said regfrigerant liquid being frozen while said container is inverted, before use of said device, said outer wall having shoulder means for preventing said refrigerant, when in solid state, from sliding down said walls,
   said outer walls also having a plurality of outward spot propections having small surface areas adjacent the top and bottom ends thereof, enabling water to drip down in-between them and enabling nesting of a plurality of said containers without resultant sticking together when they are cold, and an outer housing having an upper end on which the lip of said container rests when said device is in use, said housing being spaced from said containers at all other points to provide a dead air space therebetween, said housing being freely separable from said container by merely lifting said container out therefrom.

4. A portable device for cooling drinking glasses and the like and their contents, said glasses being of the type smoothly flaring at an angle between 10° and 30° from a narrower base to a wider upper end, said device including in combination:

a double-walled cooling container comprising two cups, namely an inner cup and an outer cup, said inner cup having a wall smoothly flared at an angle between 10° and 30° from a flat bottom wall to generally match the flare of said glass and afford contact therewith over a substantial height through a moisture film therebetween, said inner cup having a flange at its upper end connected to said wall by a short 1½° divergent portion and a cup-like depression, said outer cup having a flared wall generally parallel to and spaced out from said wall of said inner cup both radially and axially at the lower end, said outer cup having a flanged upper end with a rim coated with a gasket material, the flange of said inner cup being seamed around said rim to seal said cups together at their upper ends, a refrigerant liquid in the space enclosed between said cups and filling about 80% of said space, said outer cup having shoulder means about halfway up, with the portion thereabove being stepped out from the portion therebelow for preventing said refrigerant, when in solid state, from sliding vertically between said walls as it begins to melt, said outer cup also being formed to provide on the portion below said shoulder means a plurality of first shallow outward projections having small surface areas, enabling nesting of a plurality of said cooling containers during the time said refrigerant liquid is to be frozen, without resultant sticking together of said containers when they are cold, said outer cup additionally having a plurality of spaced-apart second shallow projections at said shoulder means to provide drip passages therebetween and to provide engagement bearings for stacking, and an outer supporting housing having an upper end freely detachably engaged by the seamed upper end of said cooling container and otherwise spaced therefrom at all points to provide a dead air space therebetween, said cooling container being freely separable from said outer housing at will by lifting it out by said seamed rim.

5. A device of claim 4 in which said outer housing is metal and in which a plastic gasket is provided on the upper end thereof for insulation of said cooling container from said supporting outer housing.

6. The device of claim 4 in which said first projections extend out about 0.030" and said second projections extend out about 0.050".

7. In a portable device for cooling drinking glasses and the like and their contents, said glasses being of the type smoothly flaring at an angle between 10° and 30° from a narrower base to a wider upper end, a double-walled cooling container comprising:

two deep-drawn cups, namely an inner cup and an outer cup, said inner cup having a wall smoothly flared at an angle between 10° and 30° from a flat bottom wall to generally match the flare of said glass and afford contact therewith over a substantial height through a moisture film therebetween, said inner cup having a flange at its upper end connected to said wall by a short 1½° divergent portion and a cup-like depression, said outer cup having a flared wall generally parallel to and spaced out from said wall of said inner cup both radially and axially at the lower end, said outer cup having a flanged upper end with a rim coated with a gasket material, the flange of said inner cup being seamed around said rim to seal said cups together at their upper ends, a refrigerant liquid in the space enclosed between said cups and filling about 80% of said space, said outer cup having shoulder means about halfway up, with the portion thereabove being stepped out from the portion therebelow for preventing said refrigerant, when in solid state, from sliding vertically between said walls as it begins to melt.

8. The container of claim 7 wherein said outer cup is also formed to provide on the portion below said shoulder means a plurality of first shallow outward projections having small surface areas, enabling nesting of a plurality of said cooling containers during the time said refrigerant liquid is to be frozen, without resultant sticking together of said containers when they are cold.

9. The container of claim 8 wherein said outer cup additionally has a plurality of spaced-apart second shallow projections at said shoulder means to provide drip passages therebetween and to provide engagement bearings for stacking.

10. The device of claim 9 in which said first projections extend out about 0.030" and said second projections extend out about 0.050".

References Cited by the Examiner

UNITED STATES PATENTS

| | | | |
|---|---|---|---|
| 1,721,311 | 7/29 | Muenchen | 62—457 X |
| 1,771,186 | 7/30 | Mock | 62—457 |
| 2,591,578 | 4/52 | McNealy et al. | 220—17 X |
| 2,622,415 | 12/52 | Landers et al. | 62—457 |
| 2,667,422 | 1/54 | Kauffman | 62—371 X |
| 2,899,098 | 8/59 | Gits | 220—17 X |
| 2,926,508 | 3/60 | Moon | 62—457 |
| 3,002,646 | 10/61 | Lewis | 220—9 |
| 3,070,275 | 12/62 | Bostron | 220—17 X |

FOREIGN PATENTS

| | | |
|---|---|---|
| 1,044,009 | 6/53 | France. |
| 1,201,792 | 7/59 | France. |

ROBERT A. O'LEARY, *Primary Examiner.*

UNITED STATES PATENT OFFICE
CERTIFICATE OF CORRECTION

Patent No. 3,205,677 September 14, 1965

Arthur M. Stoner

It is hereby certified that error appears in the above numbered patent requiring correction and that the said Letters Patent should read as corrected below.

Column 2, line 22, after "not" insert -- long --; column 3, line 60, after "be" insert -- as --; column 6, line 2, after "glass," insert a dash; line 30, strike out "in the"; line 74, after "down" insert -- between --; column 7, line 60, for "A" read -- The --.

Signed and sealed this 23rd day of August 1966.

(SEAL)
Attest:

ERNEST W. SWIDER
Attesting Officer

EDWARD J. BRENNER
Commissioner of Patents